United States Patent [19]
Firnhaber et al.

[11] Patent Number: 5,753,012
[45] Date of Patent: May 19, 1998

[54] METHOD FOR THE CLEANING OF FLUE GASES WITH DIFFERENT CONTENTS OF ACIDIC COMPONENTS

[75] Inventors: Bernhard Firnhaber, Essen; Michael Lang, Mülheim; Cort Starck, Dorsten; Wolfgang Schulte, Monheim, all of Germany

[73] Assignee: Krupp Koppers GmbH, Essen, Germany

[21] Appl. No.: 735,865

[22] Filed: Oct. 23, 1996

[30] Foreign Application Priority Data

Dec. 6, 1995 [EP] European Pat. Off. ............ 95119181

[51] Int. Cl.⁶ ............................................ B01D 47/06
[52] U.S. Cl. ........................ 95/65; 55/228; 95/66; 95/71; 95/200; 95/233; 95/235; 261/22; 261/DIG. 9
[58] Field of Search ................ 95/223–225, 187, 95/188, 198–200, 202, 206, 233, 235, 64–66, 71, 72; 96/52, 53; 55/220, 228, 229; 261/22, DIG. 9

[56] References Cited

U.S. PATENT DOCUMENTS

| | | | |
|---|---|---|---|
| 3,724,173 | 4/1973 | Fry, Sr. | 55/228 X |
| 3,726,062 | 4/1973 | Hungate et al. | 95/224 X |
| 3,780,499 | 12/1973 | Dorr et al. | 95/224 X |
| 3,800,505 | 4/1974 | Tarves, Jr. | 95/66 |
| 3,907,523 | 9/1975 | Melin, Jr. | 95/224 |
| 4,110,088 | 8/1978 | Cold et al. | 261/22 X |
| 4,369,167 | 1/1983 | Weir, Jr. | 95/224 X |
| 4,469,493 | 9/1984 | Tuovinen et al. | 95/224 X |
| 4,781,732 | 11/1988 | Wondrasch et al. | 95/71 |
| 5,413,626 | 5/1995 | Bartsch | 95/224 X |
| 5,427,608 | 6/1995 | Auer et al. | 95/53 X |

FOREIGN PATENT DOCUMENTS

29 28 526   3/1984   Germany.
29 05 719   11/1985  Germany.

*Primary Examiner*—Richard L. Chiesa
*Attorney, Agent, or Firm*—Herbert Dubno

[57] ABSTRACT

A method of operating an apparatus for the cleaning of industrial waste gases and especially power plant flue gases. The gases are fed through a quencher to a first scrubber with its own recirculation and upstream of a second scrubber having its own recirculation and aerosols of halogen compounds which are eliminated by providing the quencher is part of a prescrubber or by forming the downstream scrubber with a wet electrostatic precipitator.

8 Claims, 2 Drawing Sheets

10

METHOD FOR THE CLEANING OF FLUE GASES WITH DIFFERENT CONTENTS OF ACIDIC COMPONENTS

FIELD OF THE INVENTION

The present invention relates to an apparatus for the cleaning of industrial waste gases, especially power plant flue gases including flue gases from garbage incinerators, which contain different contents of acidic components, especially sulfur oxides and halogens, utilizing an alkaline scrubbing solution whereby a first flue gas scrubbing column with scrubbing liquid recirculation is followed by a second flue gas scrubbing column with scrubbing liquid recirculation. The invention also relates to a method of operating such an apparatus.

BACKGROUND OF THE INVENTION

An apparatus for the scrubbing of flue gases with two scrubbing columns in succession, each with a respective scrubbing liquid recirculation, can have various configurations as will be apparent from German patent document 29 05 719 C3 and German patent document 29 28 526 C3.

In such systems, an ammoniacal solution is fed by a pump from the bottom region or sump of the second flue gas scrubber and sprayed into the head of the second flue gas scrubber via the nozzle system thereof.

The concentration of dissolved salts in the scrubbing liquid increases continuously so that a portion of scrubbing liquid must always be diverted from the scrubbing liquid recirculation to hold the concentration constant. The diverted scrubbing solution is normally oxidized in a separate oxidizing unit to which air can be fed. Via a further duct, the air from which oxygen has been partly removed, is introduced into the flue gas stream upstream of the second scrubbing column. The oxidized scrubbing solution is fed to a processing system. The aforedescribed operation results in the formation of ammonium sulfate and ammonium chloride aerosols which cannot be readily removed from the gas phase in conventional droplet separators and can give rise to a clearly visible and colored smoke which emanates from the smoke stack or chimney.

OBJECTS OF THE INVENTION

It is the principal object of the present invention to provide an improved apparatus for the cleaning of flue gases of the sources described and which can be so operated that visible and possibly noxious or toxic smoke is not emitted from the stack or chimney.

More specifically, it is an object of the invention to provide an improved apparatus for cleaning flue gases, especially of power plants and refuse incinerators which can be operated with a minimum of emissions of sulfates and chlorides or other halogens from the stack from which the clean gas is emitted into the atmosphere.

Another object of this invention is to provide an improved method of operating a gas cleaning apparatus having at least two scrubbers in succession, each with a respective scrubbing liquid recirculation.

SUMMARY OF THE INVENTION

These objects and others which will become apparent hereinafter are attained, in accordance with the invention in an apparatus for the cleaning of flue gas, especially power plant flue gases and industrial waste gases from garbage incinerators or the like, which can contain different proportions of acidic components and especially sulfur oxides and halogen components, utilizing alkaline scrubbing solutions.

According to the invention, a first flue gas scrubbing column with a respective scrubbing liquid recirculation is followed by a second scrubbing column with scrubbing liquid recirculation and a quenching unit is provided upstream of the first scrubbing column for quenching the flue gas to be cleaned. The quenching unit is dimensioned and configured for substantial saturation of the flue gas to be cleaned with water vapor and the lower region of the first scrubbing column, i.e. the sump is provided with an oxidation gas feed so that this sump or a bottom portion of the first scrubber becomes an oxidation unit which can carry out oxidation of all of the scrubbing liquid which collects therein.

In the case of the scrubbing of flue gases with low contents of acidic components in the flue gas, a prescrubbing column is provided upstream of the first scrubbing column and the quenching unit is built into this prescrubbing column. The quenching solution can thus be the scrubbing solution for the prescrubbing column. A low content of acidic components in the flue gas is intended to mean a sulfur oxide content in the flue gas of less than 2700 mg/Nm$^3$ and preferably less than 2500 mg/Nm$^3$. The halogen concentration can have any customary level since halogens normally are removed practically fully in the flue gas prescrubber and detrimental aerosols do not arises here or, if such aerosols are present in the gas phase passed to the first scrubber, they are practically fully removed before the final stage.

In the embodiment for the cleaning of flue gases with high contents of acidic components, a quenching unit is provided upstream of the first scrubbing gas column and, in turn, has a quenching water feed so that the flue gas is saturated to the maximum possible extent with water vapor. High contents of acidic components means contents of sulfur oxides in the flue gas greater than 2700 mg/Nm$^3$. Here as well the concentration of the halogens can be optional. A portion of the halogens are removed especially in the first scrubbing gas column and thus by the scrubbing gas columns together. With high concentrations of halogens, aerosols can be found in the gas downstream of the second scrubber and as a consequence, in this case and in a preferred embodiment of the invention, a wet electrostatic filter is provided between the stack and the second scrubber to remove the aerosols.

In the wet electrostatic filter, the aerosols can collect on the wet surfaces of the electrostatically-charged plates by reason of electrostatic fields which are created to practically eliminate all such aerosols from the emitted gas even with very large concentrations of acidic components in the flue gas originally.

It has been found to be advantageous to provide a heat-exchanger upstream of the stack or chimney and through which a cleaned flue gas is passed in indirect heat exchange with the flue gas to be cleaned, thereby raising the temperature of the cleaned flue gas to that required for effective operation of the stack or chimney.

The apparatus according to the invention eliminates visible smoke and noxious or toxic vapors in the cleaned gas and depends in large measure on the attainment of a sufficient saturation of the flue gas prior to entry into the first scrubbing stage with water vapor. Practically 100% saturation is preferred although a saturation level of 90% can generally be used. The selection of which apparatus to employ will depend upon the sulfur oxide concentration as has been noted, but mention should be made of the fact that the transition between the high and low sulfur oxide concentrations can vary by ±200 mg/Nm$^3$, for example, and at the upper end of the low acidity concentration one can also use the second embodiment of the apparatus while at the lower end of the high acidity concentration, one can effectively use the first embodiment of the apparatus.

With respect to the method aspect of the invention, the flue gas prescrubbing column which selectively removes halogens from the flue gas is operated with a counterflow of the flue gas and the scrubbing liquid which can have a pH of less than 4.0 and preferably less than 3.0. The first scrubbing column serves primarily for the removal of sulfur dioxide and is operated in uniflow (flow of the flue gas and scrubbing liquid in the same direction) with a pH of the scrubbing liquid between 4.0 and 7.0.

The second scrubbing stage is operated in counterflow for removal of residual sulfur oxide and with a pH of the scrubbing liquid in the range of 3.0 to 5.5 and under conditions in which residual ammonia in the cleaned gas is a maximum of 10 mg/Nm$^3$. This residual ammonia can be referred to as ammonia slip.

The invention also comprises a process wherein the first scrubbing gas column is operated primarily for removal of sulfur oxide in uniflow with a pH of the scrubbing solution of 4.0 to 7.0 while the second scrubber is operated for sulfur oxide residual removal with limitations of the ammonia slip as noted. This stage is operated in counterflow with a pH of the scrubbing liquid between 3.0 and 5.5, limiting the ammonia (NH$_3$) content in the clean gas to a maximum of 10 mg/Nm$^3$.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
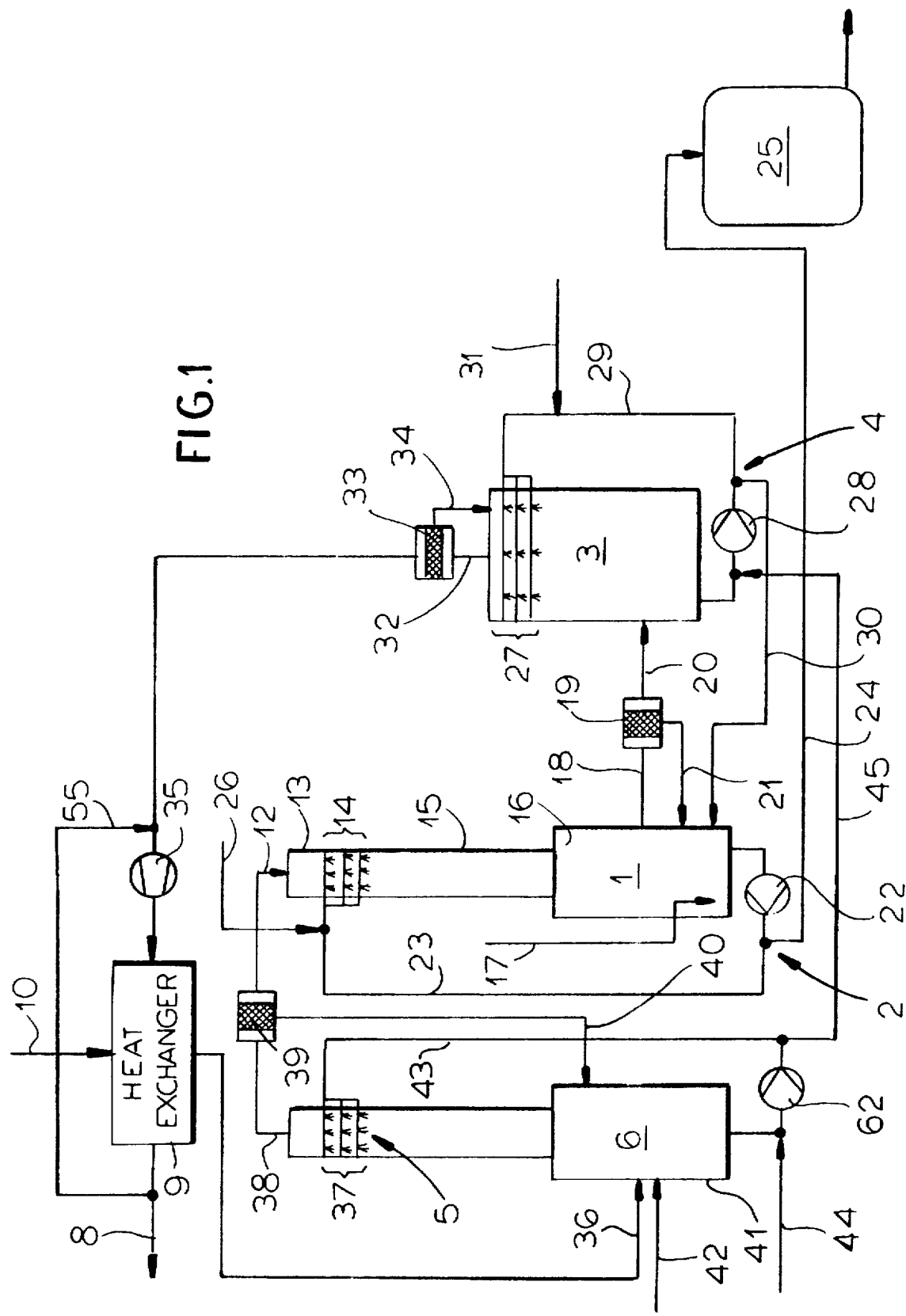
FIG. 1 is a flow diagram illustrating the first embodiment of the apparatus of the invention for a cleaning of a flue gas with a relatively low content of acetic components as defined above.
Figure 2:
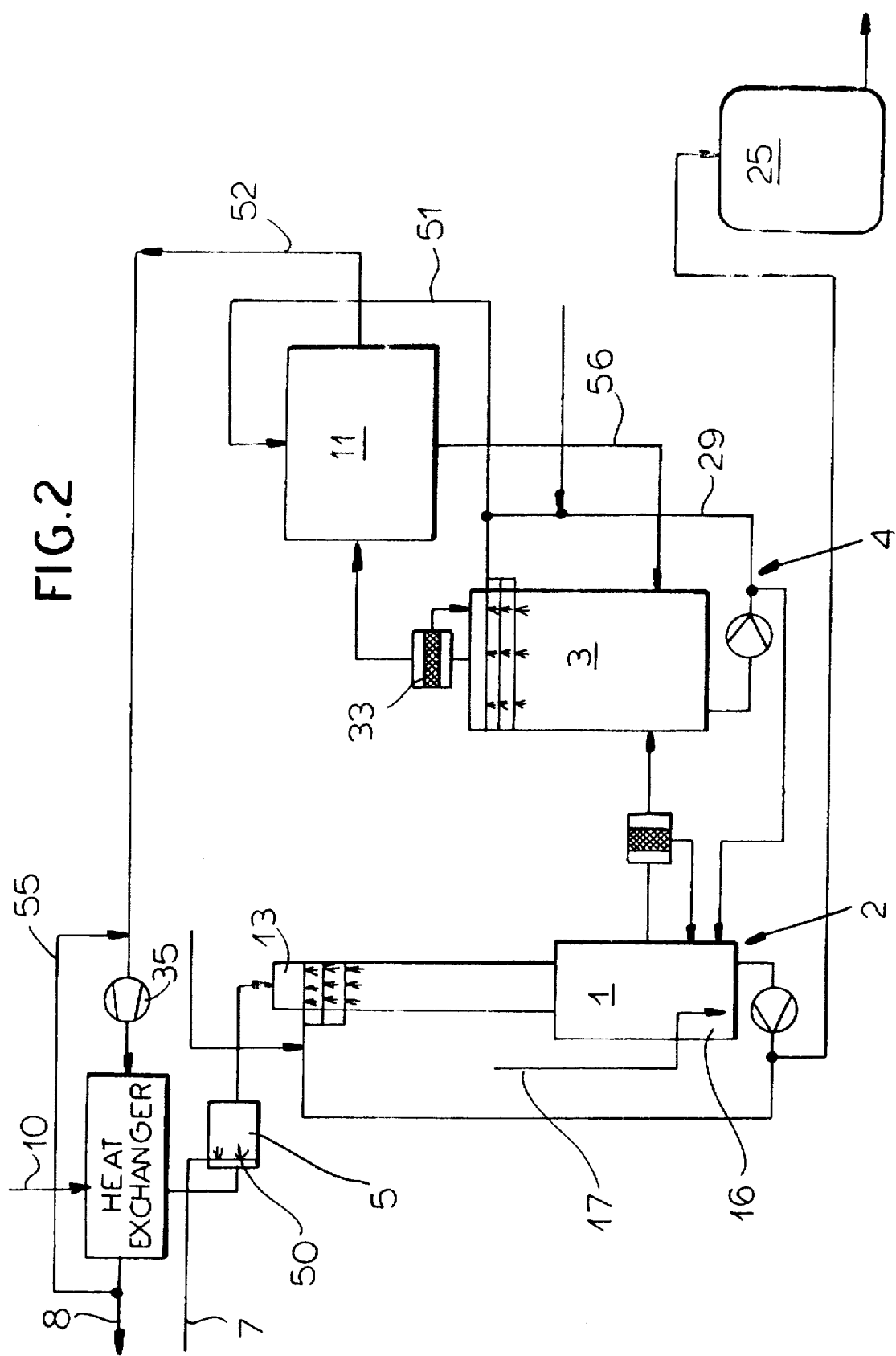
FIG. 2 is a flow diagram of a plant for the cleaning of flue gases having a higher content of acidic components.

FIGS. 1 and 2 show an apparatus for the cleaning of flue gases which can have different contents of acidic components, especially sulfur oxides, both are designed primarily to process power plant flue gases and the term "power plant flue gas" is also intended to encompass the flue gas from electrical power plants and as well as power plants for the production of heat and, as has been previously noted, the incineration of garbage.

In both types of apparatus, there is a first flue gas scrubbing column 1 with a scrubbing liquid recirculation 2 and a second flue gas scrubbing column 3 with a scrubbing liquid recirculation 4 connected downstream of the first flue gas scrubber 1.

More particularly, the flue gas can be admitted at 12 at the head 13 of the first scrubber 1, above a bank 14 of spray nozzles to pass in uniflow downwardly along the upper portion 15 of the column 1 to a sump 16 in which the liquid is collected. Oxygen or air is added at 17 to the sump at the bottom of the column 1 so that this bottom portion 16 forms an oxidizing unit of the liquid collected in the sump. The partially scrubbed flue gas passes at 18 through a mist or droplet collector 19 to the inlet 20 of the second scrubber 3. The liquid phase separated out by the droplet separator is returned at 21 to the sump 16 of the scrubber 1.

The recirculation 2 comprises a pump 22 which draws the liquid from the sump 16 and passes it via line 23 to the nozzles 14.

A portion of the oxidized sump liquid and the suspension contained therein is carried away at 24 for further processing at 25 which can involve a separation of the solid phase and neutralization if necessary. The portion diverted at 24 to the processor 25 is replaced by fresh liquid added at 26 in the form of an aqueous alkaline solution, preferably ammonium hydroxide, i.e. aqueous ammonia.

The scrubber 3 can have a bank 27 of spraying nozzles and the flue gas introduced at 20 passes upwardly while the sprayed scrubbing medium passes downwardly, i.e. in counterflow to the flue gas, the scrubbing medium being recirculated by a pump 28 and a line 29 running to the nozzles 27. A portion of the recirculated scrubbing liquid may be returned at 30 to the sump 16 of the first stage scrubber 1 and can be replaced by fresh scrubbing liquid which can be fresh water containing a neutralization agent as added at 31 for the pH adjustment. The neutralizing agent may be ammonia.

The scrubbing flue gas can be discharged at 32 via a droplet separator 33 from the collected liquid and can be returned at 34 to the scrubber 2. A blower 35 can be used to displace the flue gas.

According to the invention, a quenching unit 5 is provided for the flue gas to be cleaned. The flue gas to be cleaned is introduced at 36 to a prescrubbing column 6 which, in the embodiment of FIG. 1, is formed with the quenching unit 5, the latter being a bank 37 of spraying nozzles which spray the scrubbing liquid into the column 6 in counterflow to the rising flue gas. The flue gas leaving the column 6 at 38 passes through a droplet separator 39 to the inlet 12 of the scrubber 1. The liquid phase from the droplet separator 39 is returned at 40 to the scrubber 6.

The quenching unit 5 is so defined that a sufficient saturation is effected of the flue gas to be cleaned with water vapor. Furthermore, the lower portion or sump 41 of the scrubber 6 is designed so that it can also form an oxidation unit, i.e. is supplied with oxygen or air to oxidize the scrubbing liquid collected in the sump 41. A recirculation of the nozzles 37 is effected by a pump 67 and a line 43. Make-up liquid is supplied at 42 while a portion of the scrubbing liquid is diverted at 45 to the circulation 4. Line 44 serves to feed aqueous alkali solution, preferably aqueous sodium hydroxide for pH stabilization.

The embodiment of the apparatus for the cleaning of flue gases with the low content of acidic components in the flue gas by the above given definition thus has ahead of the first flue gas scrubbing column 1, a prescrubbing column 6 in which the quench process can be carried out. In the embodiment of FIG. 2, for the cleaning of flue gas with the high content of acidic components in accordance with the previously given definition, the quenching unit 5 is provided with a direct quenching water feed 7, i.e. without a prescrubbing column.

In the path from the blower 35 of the stack 8, the latter being represented by an arrow, an indirect heat exchanger 9 is provided through which the flue gas to be purified is fed at 10. The heat exchanger 9 thus serves to heat the purified flue gas to the temperature required for the stack or chimney to be effective.

In the embodiment of FIG. 2, a wet electrostatic filter 11 is provided between the second stage scrubber 3 and the stack 8. Here as well a heat exchanger 9 is provided to heat the flue gases which have been cleaned before they are discharged through the stack.

More subsequently, in the embodiment of FIG. 2, the prescrubber 6 is omitted and the flue gas is fed at 10 through the heat exchanger 9 and the quencher 5 into the head 13 of the scrubber 1. In the quencher 5, nozzles 50 are fed with water delivered through line 7 to saturate the flue gas as it passes through the quencher 5 with water vapor. In the sump 16 of the scrubber 1 an oxidation zone is formed to which oxygen or air is added as shown by line 17.

In the embodiment of FIG. 2, moreover, the filtered flue gas from the droplet separator 33 is supplied to the wet electrostatic precipitator 11 which receives, via the line 51, from the recirculation duct 29 of the recirculator 4, some of the scrubbing liquid from the column 3 and sprays it into the wet electrostatic precipitator 11. From the wet electrostatic precipitator, the line 52 carries the scrubbed gas, free from aerosols to the blower 35 and the heat exchanger 9 in which it is heated in indirect heat exchange with the flue gas 10.

SPECIFIC EXAMPLE

The flue gas to be cleaned is cooled in the heat exchanger 9 and, in the embodiment of FIG. 1, is fed to a prescrubber 6 which is traversed by the flue gas. The scrubbing solution is drawn off at the bottom of the prescrubber 6 and fed to the nozzle assembly 37 of the prescrubber 6. The nozzle assembly forms the quenching unit. The halogens contained in the flue gas are absorbed with the aqueous solution in the prescrubber 6 at a pH value of less than or equal to about 4.0 with a preferred pH being at most 3.0. An aqueous alkali solution, preferably an aqueous sodium hydroxide solution, can be supplied to stabilize the pH. The density of the scrubbing solution is limited to a maximum of 1.1 kg/l so that continuously a small part of the scrubbing solution must be discharged from the circulation in the prescrubber 6. As has been shown in FIG. 1, the scrubbing solution diverted from the scrubber 6 can be fed to the scrubber 3. If desired, however, this solution can be separately processed.

The flue gas passes from the prescrubber 6 through the droplet separator 19 which restricts entrainment of droplets of fluid. The process water for stack gas saturation is generally supplied by line 42 to the lower part of the prescrubber 5. The amount of process water must be sufficient that, apart from the flue gas saturation, there is also a level equalization in the lower part of the prescrubber 6. The flue gas passes then into the flue gas scrubber 1.

The scrubbing solution for the absorption is an aqueous solution of alkali, preferably of aqueous ammonia. The pH value of the scrubbing solution in the sump of the scrubbing column 1 is set to 4.0 to 7.0 and is preferably 4.5 to 5.5.

The scrubbing solution is uniformly distributed over the upper part of the scrubber cross section via one or more planes of nozzles and it is possible to set the pH value for the solution differently for each of the planes.

During the sulfur dioxide absorption, an aqueous phase of ammonium hydrogen sulfite is formed which reacts with ammonia to form ammonium sulfide. A portion of this ammonium sulfide reacts with the oxygen contained in the aqueous solution to ammonium sulfate. The advantage of the maximum possible oxidation of the aqueous solution resides in the significantly reduced ammonia partial pressure of the ammonium sulfate by comparison with ammonium sulfite or ammonium hydrogen sulfite. That lowers the aerosol formation potential significantly. The nonoxidized part of the ammonium sulfite is thus oxidized to ammonium sulfate in part by the introduction of an oxidation device.

Preferably for this purpose, the oxidation is carried out internally, i.e. by the blowing of air or oxygen into the lower part of the flue gas column 1 to effect an intense turbulence therein which can be promoted by agitators or stirrers.

Since the transfer of oxygen to the scrubbing solution is limited, the volume of the lower part of the scrubbing column 1 must be matched to the ammonium sulfite quantity to be oxidized. The oxidation is so carried out that the ammonium sulfite/ammonium hydrogen sulfite concentration of the scrubbing liquid is 0 to 10 g/l, preferably between 0.5 to 3.0 g/l.

From the circulation of the scrubbing column 1 enough scrubbing liquid is diverted to maintain the salt content of the scrubbing liquid between about 25 to 40 weight percent, preferably between 28 to 30 weight percent.

The diverted scrubbing liquid can be passed into a collecting vessel where it can be subjected to oxidation of any residual oxidizable component.

Various industry tested processes can be used for the further treatment of the diverted scrubbing liquid.

The flue gas leaves the scrubbing column 1 through a droplet separator which prevents entrainment of the liquid phase. The flue gas is then admitted to the flue gas scrubbing column 3. The scrubbing liquid is drawn off at the bottom of this scrubber and is recirculated to one or more nozzle planes at the top of this flue gas scrubber. The scrubbing liquid has only a small concentration of dissolved components. Its density is limited to a maximum of 1.1 kg/l. The pH value of the scrubbing liquid in the lower part of the scrubber 3 is adjusted to a pH value of 3.0 to 5.5 (preferably 4.0 to 4.5). For this purpose small amounts of aqueous ammonia can be added. Note that while relatively low pHs prevail in the scrubber sumps because the acid components are washed out of the gas, the alkaline scrubbing solutions used make the process overall an alkaline scrubbing process.

The low pH value of the scrubbing solution can reduce the $NH_3$ slip to less than 10 mg/Nm$^3$ The scrubbing solution from the scrubbing column 3 is fed to the scrubbing column 1 to compensate for the level change therein of the scrubbing liquid in the sump. Similarly the level in the scrubbing column 3 is compensated by scrubbing solution from the prescrubber 6. Apart from the diverted portion of the scrubbing solution, from which variable products can be recovered, in the process described no solid or liquid residues are produced.

The flue gas is discharged from the scrubbing column 3 via the droplet separator which limits entrainment of liquid. The flue gas which is substantially free from oxidic components is displaced by the blower 35 through the heat exchanger 9 in which the flue gas to be cleaned is preheated and thus enters the chimney or stack in a stirred state to provide the draft required for stack operation. No additional energy need be supplied in the stack to discharge the cleaned flue gas. To reduce condensation and the formation of deposits, a part of the cleaned flue gas after its discharge from the heat exchanger 9 can be returned to the suction side of the blower to further increase the temperature of the flue gas ahead of the blower above the water vapor dew point. This recirculation is represented by the arrow 55 in FIGS. 1 and 2.

In the embodiment of FIG. 2 for higher sulfur oxide concentrations, the prescrubber 6 is omitted, the flue gas is fed directly through the quencher 5 and is there saturated with water, and the water saturated flue gas passes directly into the scrubber 1. The formation of aerosols cannot be fully suppressed in this manner and a high salt content up to slightly below the saturation limit of about 40% by weight in the scrubbing solution is possible. In this case, therefore, the aerosol is removed by the wet scrubber 11. The flue gas, after leaving the scrubber 3 passes through the droplet separator 33 into the wet electrostatic filter 11.

Since the separated aerosols are highly water soluble, encrustation of the precipitator electrode can be avoided by spraying water or, via the line 51, spraying scrubbing solution onto the electrode surfaces. The solution collected in the wet electrostatic precipitator 11 is returned at 56 to the process, e.g. via the scrubber 3. The aerosol concentration following the wet electrostatic filter lies clearly below 15 mg/Nm$^3$ so that any vapors discharged through the stack are invisible since they have not been made visible by sufficient concentration of aerosols.

We claim:

1. A method of cleaning a flue gas having a relatively high content of acidic components including sulfur oxide and halogen components, the apparatus comprising:

a first gas scrubbing column receiving a gas to be scrubbed and having a first recirculation for a scrubbing liquid;

a second gas scrubbing column downstream of said first gas scrubbing column and receiving a scrubbed gas therefrom for further scrubbing the scrubbed gas, said second gas scrubbing column having a second recirculation for a scrubbing liquid for said second gas scrubbing column;

a quenching unit for gas to be scrubbed connected upstream of said first gas scrubbing column and provided to substantially saturate the gas to be scrubbed with water vapor prior to entry of the gas to be scrubbed into said first scrubbing column; and means at a bottom of said first scrubbing column for oxidizing scrubbing liquid of at least said first recirculation collecting at said bottom of said first scrubbing column, said method comprising the steps of:
  (a) feeding said quenching unit directly with quenching water;
  (b) operating said first gas scrubbing column in counterflow with a scrubbing liquid having a pH of 4.0 to 7.0; and
  (c) passing the scrubbing gas from said first gas scrubbing column through said second gas scrubbing column in uniflow with a scrubbing liquid having a pH of 3.0 to 5.5 while limiting NH$_3$ entrainment by the scrubbed gas emerging from said second gas scrubbing column to a maximum of 10 mg/Nm$^3$.

2. The method defined in claim 1, further comprising the step of collecting aerosols from the scrubbed gas emerging from said second gas scrubbing column in a wet electrostatic precipitator.

3. The method defined in claim 1, further comprising the step of passing gas to be scrubbed in indirect heat exchange with the heated gas emerging from said second gas scrubbing column, thereby cooling the gas to be scrubbed prior to its entry into said quenching unit and heating the scrubbed gas prior to discharge thereof through a stack.

4. The method defined in claim 1, further comprising the step of stripping droplets of scrubbing liquid from the gas emerging from each of said columns and returning collected scrubbing liquid upon such separation to the respective column.

5. A method of operating an apparatus for the cleaning of a flue gas with a relatively low content of acidic components including sulfur oxide and halogen components in which the apparatus comprises:

a first gas scrubbing column receiving a gas to be scrubbed and having a first recirculation for a scrubbing liquid;

a second gas scrubbing column downstream of said first gas scrubbing column and receiving a scrubbed gas therefrom for further scrubbing the scrubbed gas, said second gas scrubbing column having a second recirculation for a scrubbing liquid for said second gas scrubbing column;

a quenching unit for gas to be scrubbed connected upstream of said first gas scrubbing column and provided to substantially saturate the gas to be scrubbed with water vapor prior to entry of the gas to be scrubbed into said first scrubbing column; and means at a bottom of said first scrubbing column for oxidizing scrubbing liquid of at least said first recirculation collecting at said bottom of said first scrubbing column, said method comprising the steps of:
  (a) selectively removing said halogen components by passing flue gas to be scrubbed through a flue gas prescrubbing column containing said quenching unit in counterflow to a scrubbing liquid having a pH below about 4.0;
  (b) selectively removing sulfur dioxide from the flue gas to be scrubbed in said first gas scrubbing column by passing the gas from said prescrubbing column through said first scrubbing column in uniflow with a scrubbing solution with a pH in the range of 4.0 to 7.0; and
  (c) selectively removing residual sulfur oxide from the scrubbed gas of said first gas scrubbing column in said second gas scrubbing column by passing the gas in said second gas scrubbing column in counterflow to a scrubbing liquid having a pH of 3.0 to 5.5 while limiting entrainment of ammonia in the scrubbed gas emerging from said second gas scrubbing column to a maximum of 10 mg/Nm$^3$.

6. The method defined in claim 5 wherein the pH of said scrubbing liquid in said prescrubbing column is less than 3.0.

7. The method defined in claim 5, further comprising the step of passing gas to be scrubbed in indirect heat exchange with the heated gas emerging from said second gas scrubbing column, thereby cooling the gas to be scrubbed prior to its entry into said quenching unit and heating the scrubbed gas prior to discharge thereof through a stack.

8. The method defined in claim 5, further comprising the step of stripping droplets of scrubbing liquid from the gas emerging from each of said columns and returning collected scrubbing liquid upon such separation to the respective column.

* * * * *